Inventors
Ernest L. Lilja and
Andrew Paterson
By Spencer, Marzall, Johnston & Cook Attys May 22, 1951 E. L. LILJA ET AL 2,554,339
GLASS CUTTING MACHINE
Filed March 28, 1949 6 Sheets-Sheet 4

Inventor
Ernest L. Lilja and
Andrew Paterson
By Spencer, Marzall, Johnston & Cook Attys May 22, 1951  E. L. LILJA ET AL  2,554,339
GLASS CUTTING MACHINE
Filed March 28, 1949  6 Sheets-Sheet 5
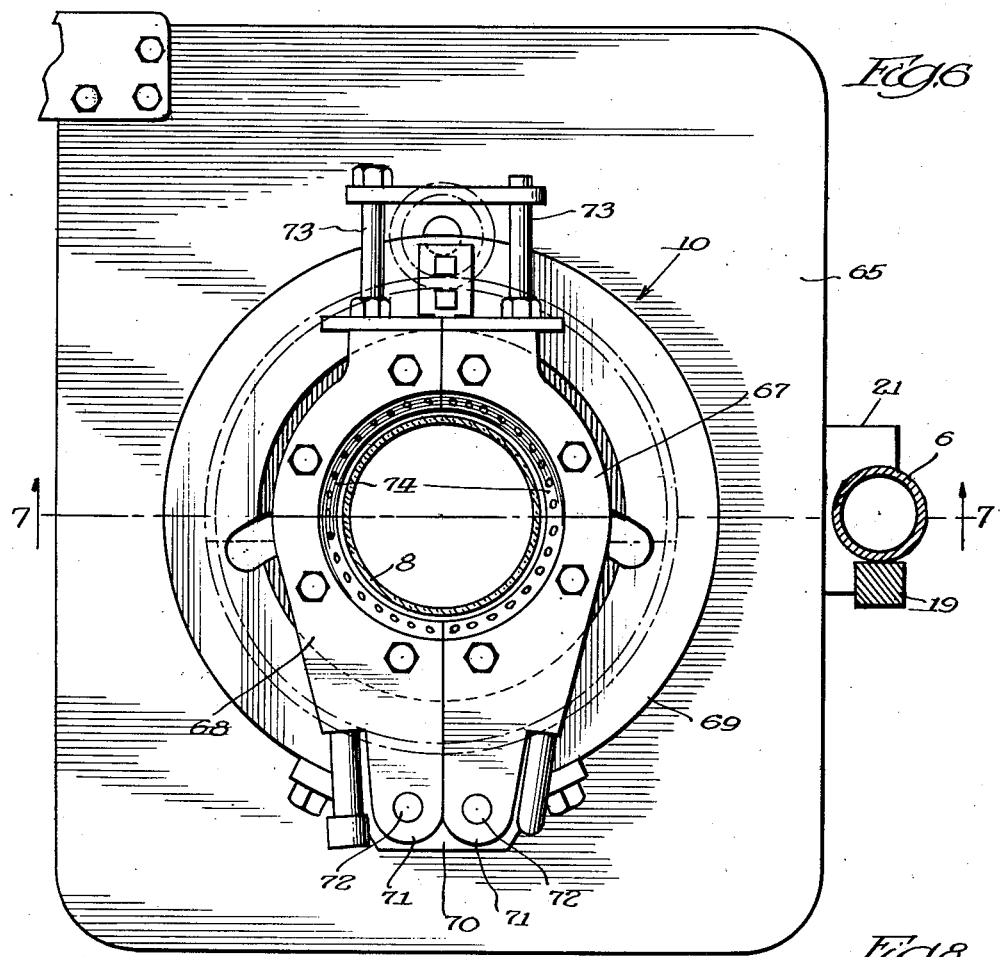
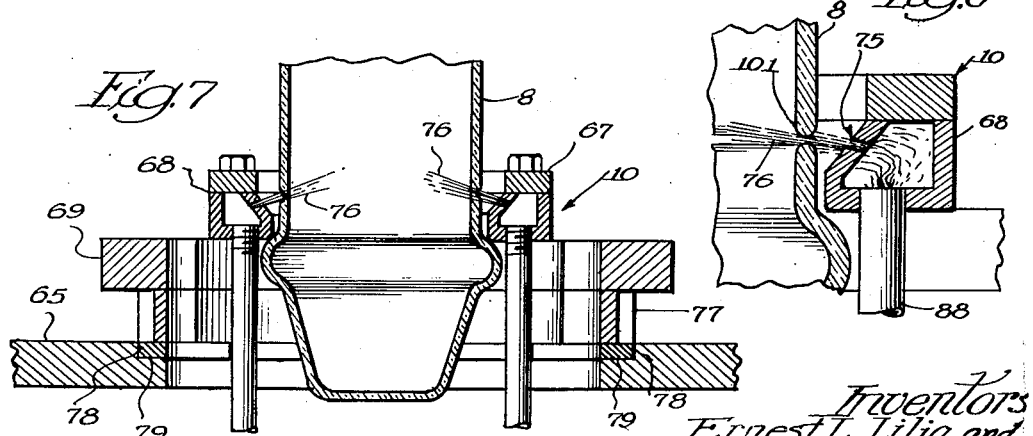
Inventors
Ernest L. Lilja and
Andrew Paterson
By: Spencer, Marzall, Johnston + Cook Attys

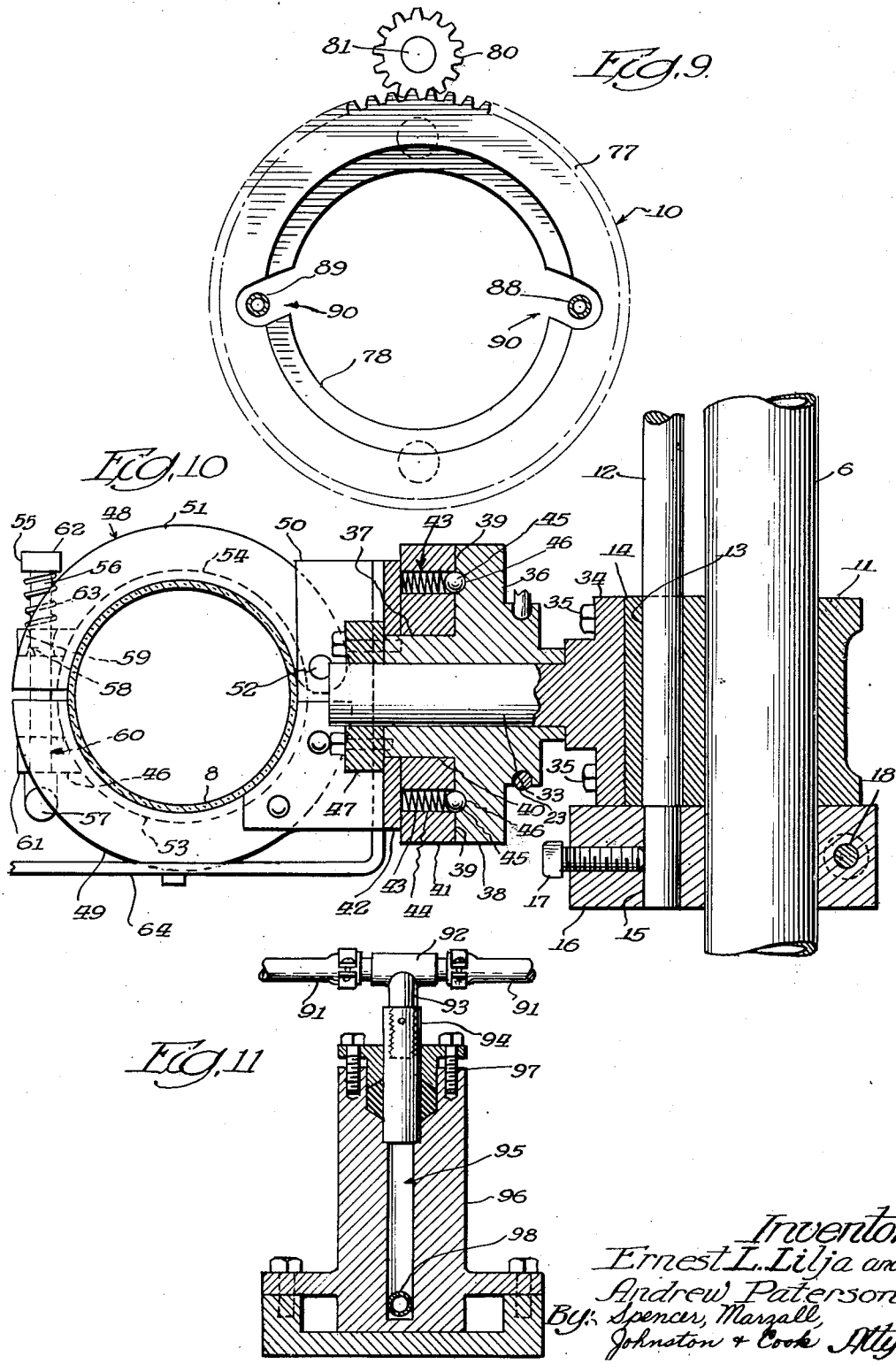

Patented May 22, 1951

2,554,339

UNITED STATES PATENT OFFICE 2,554,339

GLASS CUTTING MACHINE

Ernest L. Lilja and Andrew Paterson, Chicago, Ill., assignors to Chamberlain, Inc., Chicago, Ill., a corporation of Illinois Application March 28, 1949, Serial No. 83,832

2 Claims. (Cl. 49—50)

This invention relates in general to glass cutting machines, and it has more particular reference to cutting machines wherein a ring shaped burner, adapted to produce a series of inwardly impinged flames, is rotated about a vertical axial center line and about the exterior of a stationarily held glass work piece, so as to cut or burn off the work piece without leaving undulating or beaded surfaces.

An important object of the invention resides in the provision of a new and improved machine of the sort mentioned having novel means for supporting a glass article, such as a cylinder, in position to be cut or burned off in the machine, including a novel arrangement for positioning the glass article with respect to the burner, and an improved arrangement for effecting the rotation of the burner and for maintaining a constant gas connection with the burner.

Another object of the invention is the provision of a glass burn-off machine having an article support of novel construction for securing the article to be burned off or severed, the article support being mounted for vertical movement and for pivotal movement about a horizontal pivot, whereby to facilitate the mounting of a glass article in the machine, as well as the positioning of the article within the burner; a further object being to provide a rotary burner having parts which are shiftable with respect to each other to open and close the burner.

Still another object of the invention resides in the novel method of supporting the article on a vertically shiftable and pivotally mounted holder to position the article properly with respect to a burner, the article being maintained in stationary position on the holder and the burner being rotated to effect the cutting operation by impinging gas flames issuing from the burner.

Numerous other objects and advantages will be apparent throughout the progress of the specification which follows.

The accompanying drawings illustrate a certain selected embodiment of the invention, and the views therein are as follows:

Fig. 6 is a view substantially the same as Fig. 4, but showing the burner jaws in the closed position;

Fig. 7 is a detail vertical sectional view on line 7—7 of Fig. 6;

Fig. 8 is an enlarged detail sectional view showing the burner flame severing the glass article;

Fig. 9 is a top plan view of the gear ring and pinion for revolving the burner head;

Fig. 10 is a detail vertical sectional view on line 10—10 of Fig. 2; and

Fig. 11 is a vertical sectional view on line 11—11 of Fig. 1.

Figure 1:
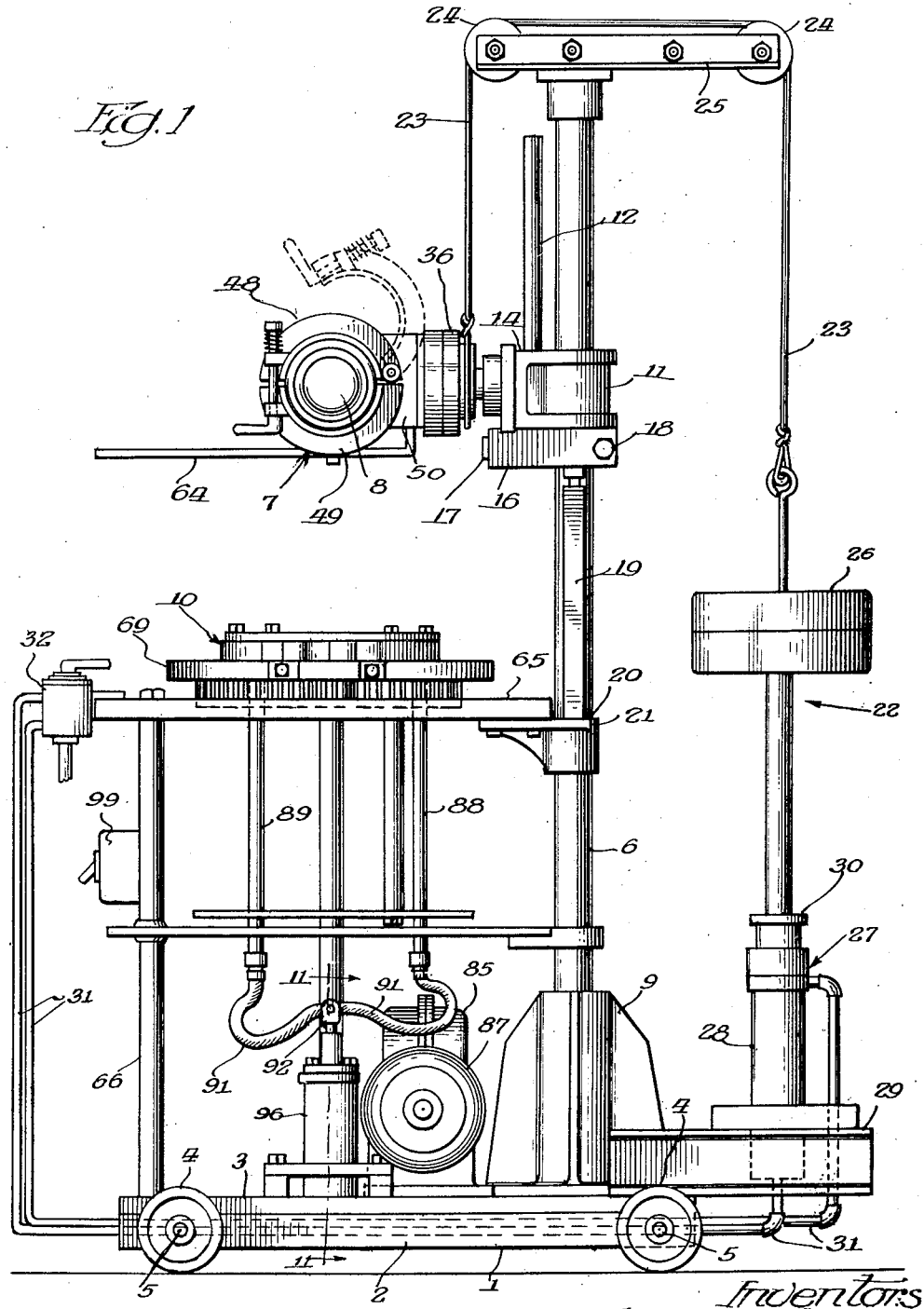
Fig. 1 is a side elevational view of the machine with the glass article support in lowered position and the glass article horizontally disposed.
Figure 2:
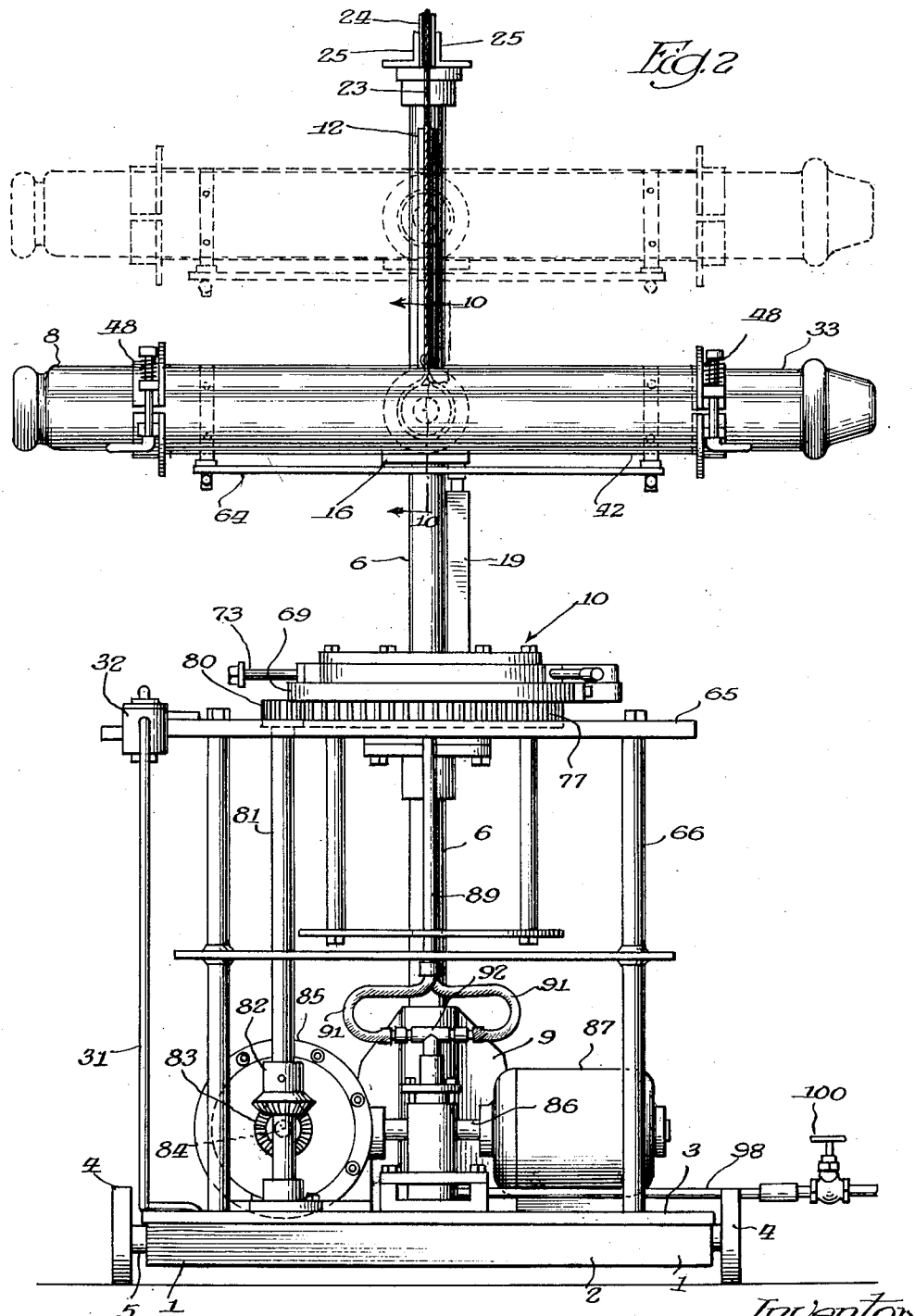
Fig. 2 is a front elevational view of the machine, the article and support being full lines in the same position shown in Fig. 1.

The particular machine herein illustrated for the purpose of describing the invention comprises a base 1, of any suitable size and shape, which supports the various parts of the machine, Figs. 1 and 2. As shown, the base may be rectangular in shape and may comprise a supporting structure 2 carrying a top plate 3. The machine, if desired, may be made mobile or ambulatory by the provision of a plurality of wheels 4 mounted on axles 5 projecting outwardly on opposite sides of the base.

A post 6 on the base carries a holder 7 adapted to hold and support a glass article, such as a glass tube 8, in proper position to be cut or burned off. The post 6 is supported in upright position by a standard 9 mounted on the top wall 3 of the base. The post or pedestal 6 may also aid in supporting the various parts of a burner mechanism 10 for burning off or severing the supported article 8.

The article holder 7 is vertically adjustable on the post 6 so that the supported article 8 may be positioned properly with respect to the burner mechanism 10. To this end, the article holder 7 is connected to a collar 11 which is slidably mounted on the post 6, and is guided vertically and maintained in a forwardly extending position with respect to the post by a vertical guide rod 12. The rod 12 passes loosely through a bore 13 formed, Fig. 10, in an integral forwardly projecting part 14 on the collar 11, Figs. 1 and 10. The guide rod 12, at its lower end, fits into a socket 15 formed in a split collar member 16 which may be clamped in predetermind position on the post 6. The lower end of the guide rod 12 may be held tightly and securely in the split collar 16 by means of a set screw 17 having threaded engagement in the forward part of the split collar. The split collar 16 may be released from clamping engagement with the post 6 by loosening a bolt 18 which normally holds the split collar in tight clamping engagement with the post. The split collar 16, when clamped on the post 6, may be used as a stop to limit downward movement of the collar member 11 and, therefore, the support or holder element 7, with respect to the post 6, To insure that the split collar 16 will not slide down the post 6 in case the bolt 18 accidentally becomes loose, a stop bar 19 of the required length may be positioned between the underside of the split collar 16 and the upper surface 20 of a bracket 21 attached to the post 6, Fig. 1.

The article support 7, and its associated attachments may be provided with counterbalancing means 22 to facilitate the raising and lowering of the article 8 with respect to the burner mechanism 10. This counterbalancing means may comprise a cord or cable 23 trained over a pair of rollers 24 carried by a support 25 at the upper end of the post or pedestal 6. One end of the cord or cable 23 may be secured to the article support 7 and the other end may be secured to a weight 26 which acts as a counterbalance.

The article support 7 may be moved either upwardly or downwardly to maneuver the glass article 8 into proper position to permit the article to be burned off or cut by the burner 10 at the precise desired point. If desired, hydraulic means 27 may be provided to raise and lower the article support 7 and the article 8 supported thereon. Such hydraulic means may comprise a vertical cylinder 28 carried by a pair of horizontal channel members 29 projecting outwardly and rearwardly from the base 1 of the machine, Fig. 1. The cylinder 28 may have a piston 30 slidably mounted therein, the piston being adapted to be raised by introducing a fluid medium under pressure, such as compressed air or the like, into the cylinder 28 by any suitable conventional means. The piston 30 may be connected at its upper end to the weighted member 26. Fluid lines 31 lead to the cylinder 28, and fluid through these lines is controlled by a valve 32 to which fluid is supplied. Operation of the valve 32 causes the piston to raise and lower, and inasmuch as the piston 30 is connected to the weight 26, the weight will be raised and lowered and consequently the article support 7 will raise and lower accordingly.

Figure 3:
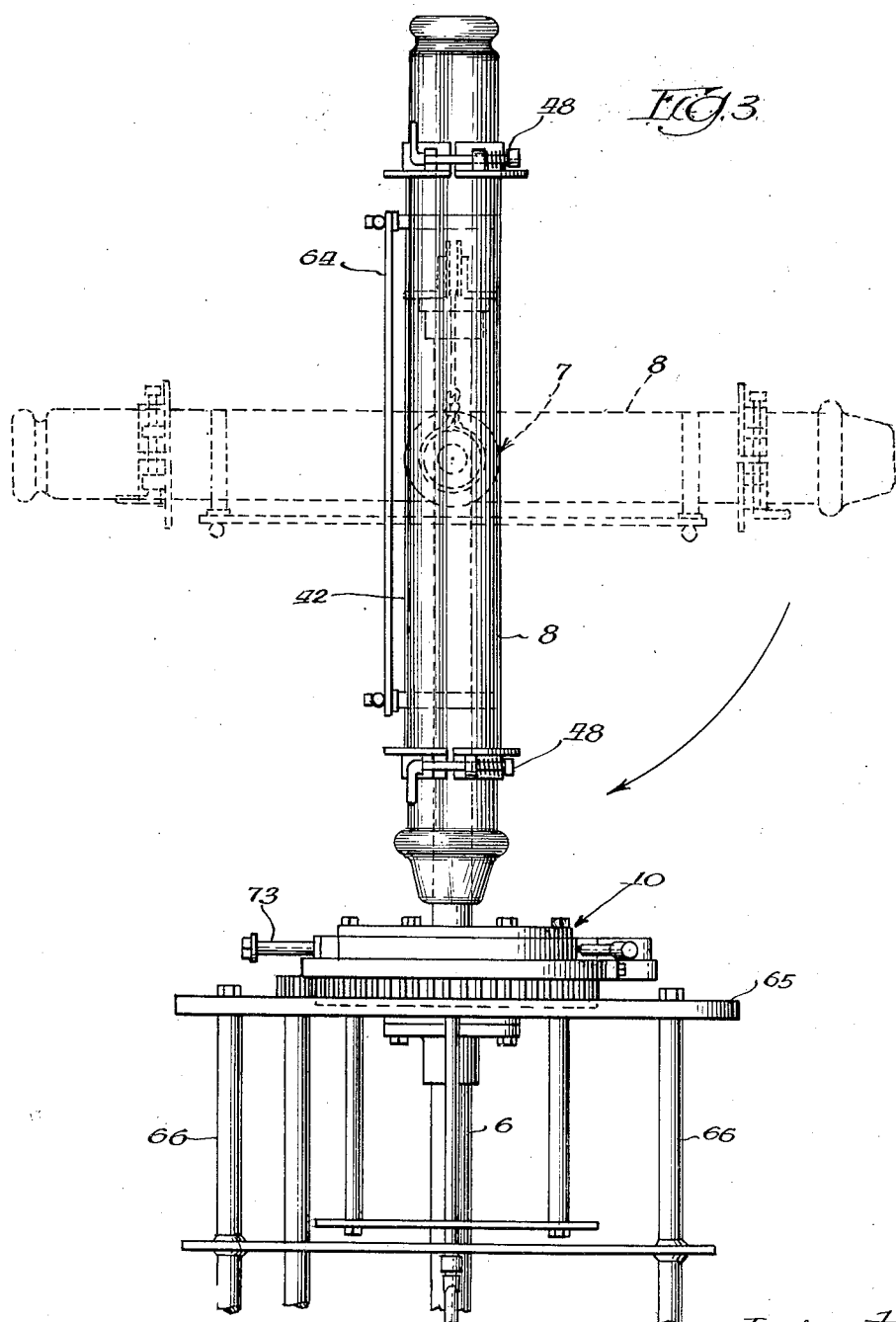
Fig. 3 is a detail front elevational view, partly broken away, showing the article swung into a vertical position ready to be lowered into the burner.

The support 7 preferably is constructed so that it may be pivoted at its center about a horizontal axis, in order that the glass article 8 may be positioned easily on the support, Figs. 1 and 2. The holder 7 and the applied article 8 is swung from its applied horizontal position as shown in full lines in Figs. 1 and 2 to its vertical position shown in full lines in Fig. 3. The article 8 may then be arranged in lowered position, Figs. 5, 7 and 8, so that the end of the article may be cut by being burned off by the burner mechanism 10, Fig. 8.

The holder 7, Fig. 10, is rendered pivotable by the provision of a horizontal stub shaft 33, having at one end thereof an integral flanged or enlarged part 34 which is rigidly secured by bolts 35 to the forwardly projecting part 14 of the collar member 11, Fig. 10. The stub shaft 33 has a hub member 36 slipped thereon, the hub member being pinned in any suitable manner to the stub shaft 33 so as to prevent rotatable and longitudinal movement thereon. The hub member 36 comprises a forward shank part 37 which extends forwardly from an enlarged part 38, whereby a shoulder 39 is provided therebetween. The shank part 37 extends through an opening or bore 40 of a collar 41 which is rotatably mounted on the shank part 37. The collar 41 is integrally connected at its forward face to an elongated supporting plate 42 by a welded or other suitable connection. A plurality of longitudinal bores 43 may be provided in the collar 41 to receive coil springs 44, each spring 44 being adapted to urge a ball detent 45 against the shoulder 39 of the hub member 36. Indents 46 are formed in the face of the shoulder 39 to receive the ball detents 45. The spring urged ball detents 45 hold the holder 7 in either a horizontal or vertical position by friction when the balls 45 are in their respective indents 46. The holder 7 may be easily shifted from one position to the other by applying a pressure to the holder to dislodge the balls from their sockets, whereupon the holder may be turned easily on its pivot until the balls again fall in the indents or sockets 46. A collar 47, Fig. 10, is slipped over the end of the stub shaft 33 and is bolted to the outer end of the hub 36. This collar 47 holds the supporting plate 42 and collar 41 on the shank part 37 of the hub 36.

The supporting plate 42, Fig. 10, carries at its opposite ends a pair of clamping elements 48 which are adapted to be clamped on the glass article 8. The lower part of each clamping element 48 comprises a lower C-shaped clamping member 49 which is secured to a lateral extension 50 on the end of the supporting plate 42. The upper part of each clamping element 48 comprises a second C-shaped clamping member 51 pivotally mounted at its inner end on a pin 52 fastened to the lateral extension 50. It is desirable that the clamping elements 49 and 51 be provided with surfaces which are sufficient for properly contacting the outer surface of the article 8. The lower clamping element 49, and the upper clamping element 51, therefore, are each provided with laterally extending flanges or webs 53 and 54, respectively, which are adapted to contact the outer surface of the article 8.

The clamping members 49 and 51 of each clamping element 48 may be held in clamping position against the glass article 8 by means of an L-shaped pin 55, comprising a leg 56 which is provided with a lateral extension or handle part 57 at its lower end. The pin 55 is received near its upper end in a bore 58 provided in a boss 59 on the outer end of the upper clamping element 51. The bore 58 is flared outwardly at its opposite ends, as clearly shown in Fig. 10, so that the pin 55 may be rocked therein. The pin 55 is adapted to be received near its lower end above the lateral extension or handle part 57 in a slot 60 formed in a boss 61 which is integral with the outer end of the lower clamping element 59. The leg 56 of the pin 55 may have an enlarged part 62 at its upper end, there being a coil spring 63 positioned around the leg 56 between the enlarged part 62 and the boss 59 to maintain the clamping members 49 and 51 in proper clamping engagement against the glass tube 8.

The glass article 8 may be positioned between the upper and lower clamping elements 49 and 51 of each clamping member 48 by grasping the lateral extension or handle part 57 of the pin 55 and rocking the pin 55 outwardly so that it is disengaged from the boss 60 on the lower clamping element. The upper clamping element 51 is then pivoted upwardly, and the glass article 8 is mounted on the lower clamping element 49. The upper clamping element 51 is then brought downwardly until it comes in contact with the glass article 8. The pin 55 is pressed downwardly against the force of the coil spring 63, and the pin 55 is rocked inwardly until it is fully received in the slot 60 of the boss 61.

The holder 7 has a handle 64 which may be grasped to turn the holder on its pivot.

The burner mechanism 10 is adapted to be mounted on a top plate 65 which is supported by the uprights 66 extending upwardly from the base 1 and also by the bracket 21 on the post 6. The burner mechanism 10, Figs. 4–8, comprises a pair of burner elements 67 and 68 which are connected to a rotatably mounted ring 69. The ring 69 has an extension 70 formed thereon, and the burner elements 67 and 68 each have a tail piece 71 which are pivotally connected at 72 to the extension 70 on the ring 69.

Figure 4:
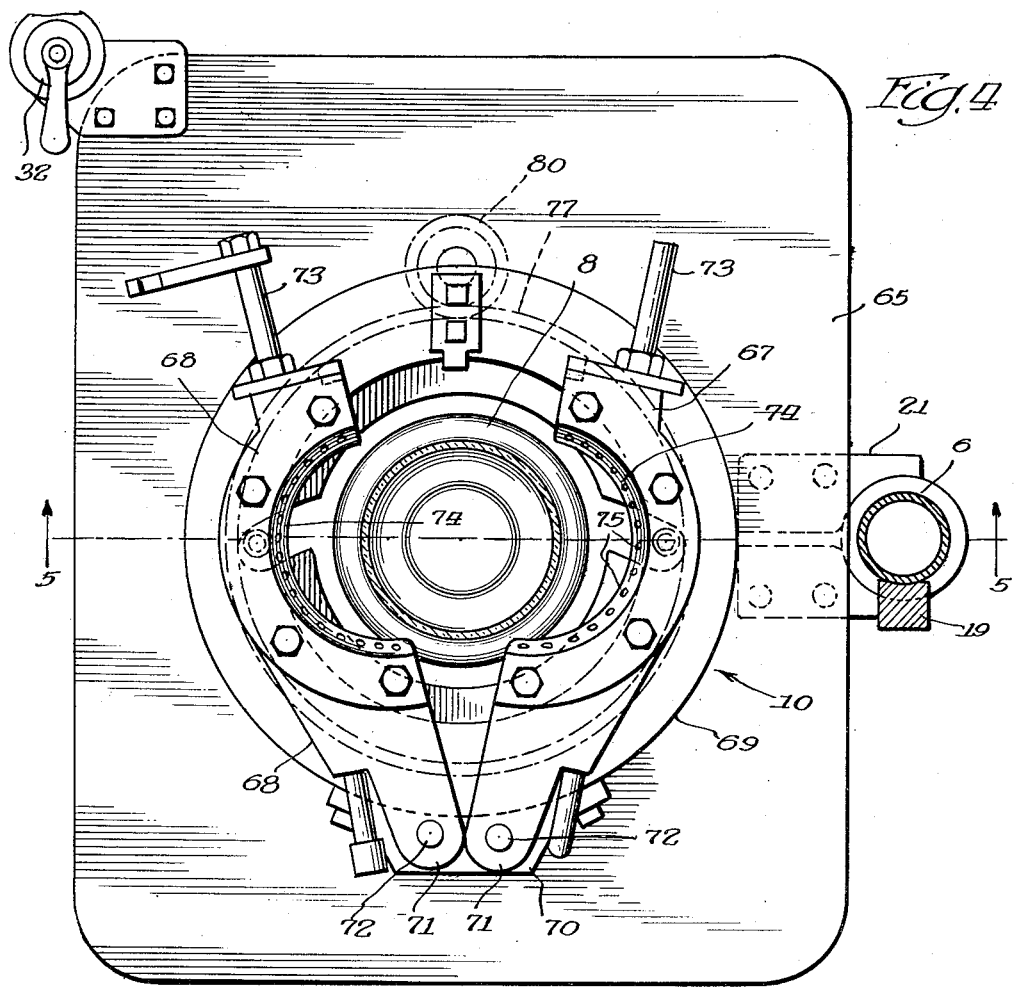
Fig. 4 is a detail top plan view of the table and the revolving burner head, the jaws of the burner head being shown in open position with the glass article arranged between the jaws.

The ends of the burner elements 67 and 68 are provided with handle elements 73 so that they may be spread apart from the position shown in Fig. 6 to the position shown in Fig. 4. The burner elements 67 and 68 are each provided with arcuate burner parts 74 which are relatively semicircular so that when they are moved from the open position shown in Fig. 4 to the closed position shown in Fig. 6 they will comprise a complete circular burner. The inner circular periphery of the burner elements 67 and 68 are provided with a plurality of spaced holes 75 of a predetermined configuration so as to produce inwardly impinging gas flames 76, Figs. 7 and 8. The ring 69 is adapted to be secured to a gear 77, Figs. 4–8, which carries an annular plate 78 at its lower end. The annular plate 78 is arranged in a circular recess or depression 79 in the top plate 65. This plate 78 rests upon the material at the bottom of the depression 79 and rotatably supports the gear 77. The gear 77 is adapted to be driven by a driving pinion or gear 80, Figs. 1, 2 and 9, and this gear 80 is connected to the upper end of a drive shaft 81. The drive shaft carries a bevel gear 82 at its lower end, Fig. 2, which meshes with a cooperating bevel gear 83, Fig. 2. The bevel gear 83 is mounted on a shaft 84 extending from a gear box 85 in which there are reduction gears (not shown). The reduction gears in the gear reduction box 85 are driven by the drive shaft 86 of an electric motor 87, Fig. 2. The operation of the motor 87 thus drives the drive shaft 81 and the pinion or gear 80 which meshes with the gear 77 mounted on the supporting table 65. The rotation of the gear 77 thus causes the burner elements 67 and 68 to also rotate.

The burner elements 67 and 68 are supplied with gas through the pipes 88 and 89, respectively. The upper ends of the gas pipes 88 and 89 pass through the lower ring 78, the gear 77 and the upper ring or plate 69, and have screw threaded engagement with the respective burners to which they feed. The lower ring 78, the gear 77 and the upper plate 69 are each provided with an arcuate cut-out 90 through which the pipes 88 and 89 pass, and these pipes are rotatable with the elements 78, 77, 69 and the burner elements 67 and 68. The bottom of the gas pipes 88 and 89 carry flexible pipes or hoses 91 which are connected to the arms of a T-fitting 92, Figs. 1, 2 and 11. The lower leg 93 of the fitting 92 is connected to a sleeve 94 which communicates with a bore 95 of a housing 96 which forms a mixing chamber for the gas. A stuffing box 97, Fig. 11, makes a gas-tight connection between the sleeve 94 and the housing 96. A gas inlet pipe 98 leading to a source of gas supply has communication with the central bore 95. The construction and arrangements of parts, therefore, is such that the rotation of the burners, and the associated elements to which the burner elements are connected, are free to pivot with the sleeve 94 in the stuffing box 97. The slots 90 permit the gas pipes or lines 88 and 89 to be moved inwardly and outwardly to permit closing and opening of the burner elements.

The burner elements 67 and 68 are adapted to be arranged in open position as shown in Fig. 6, so that the glass article 8 may be positioned between the burner parts without contacting the burner parts, and therefore prevent the article from touching any of the parts of the burner mechanism when the article is inserted downwardly between the burners. After the article has been properly positioned the burner elements 67 and 68 are moved from the open position shown in Fig. 4 to the closed position shown in Fig. 6, whereupon the electric switch 99, Fig. 1, is operated to start the motor 87 and thereby cause rotation of the burner elements 67 and 68.

It is desirable that gas be fed to the burner elements 67 and 68 at all times but in a very low flame, in the nature of a pilot flame, but when it is desired to cut the glass by a burning-off process a gas controlled valve 100, Fig. 2, is operated to bring the burners to full flame. The gas employed in the present invention consists of the usual city gas supply plus an acetylene gas to insure a flame of sufficient heat intensity.

Figure 5:
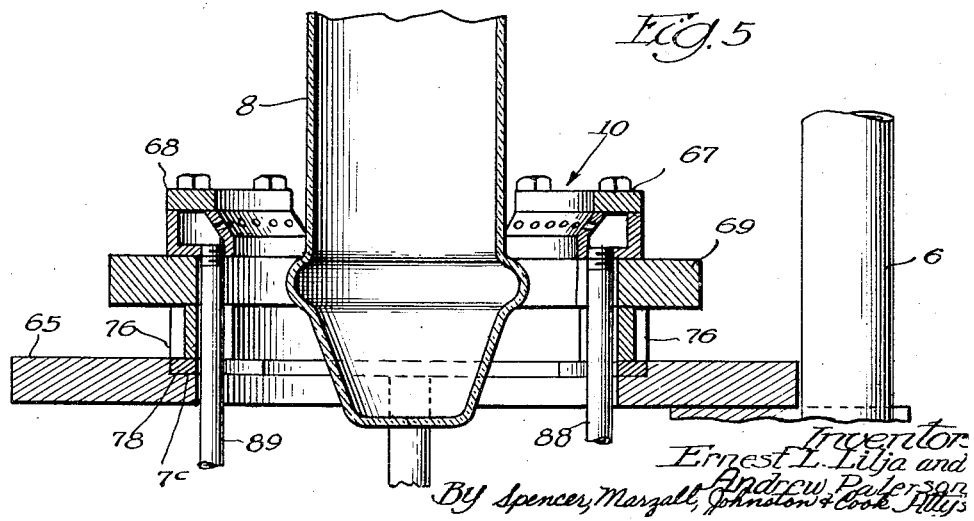
Fig. 5 is a detail vertical sectional view on line 5—5 of Fig. 4.

The device of the invention comprises a glass burn-off or cutting machine which is particularly adaptable for long tubular or cylindrical glass pieces. The long glass articles are adapted to be held in the holder 7 and mounted therein in horizontal position at a convenient height to permit easy handling. After the glass is arranged in position the holder 7 is shifted 90° to move the glass article from the dotted line position shown in Fig. 3 to the full line position in that figure. The holder is then moved downwardly and inserted between the open burner elements as shown in Figs. 4 and 5, whereupon the burners are brought together in closed position as shown in Fig. 6, and when the gas valve is operated the gas will provide inwardly impinged flame, Fig. 7, so as to cut the glass completely about its periphery as indicated at 101, Fig. 8.

*Operation*

The operation of the device consists in first moving the work holder 7 so that it will be arranged at a convenient height for the reception of a glass article, the glass article in the present instance being an elongated tubular or cylindrical member. The lowermost movement of the article holder 7 is such that when the collar 11 on the holder strikes the split collar 16 the lower end of the cylindrical article 8 will be in position so that it will be cut off properly at the precise point. After the article is arranged in the holder 7 and is clamped therein in the position shown in full lines in Fig. 2, it is swung 90° about its pivot from the full line position shown in Fig. 2, and the dotted line position shown in Fig. 3 to the full line position shown in Fig. 3. The handle 64 on the holder 7 is then pulled downwardly until the collar 11 on the holder strikes the split collar 16, whereupon the article 8 will be in the position shown in Fig. 5. The burner sections 67 and 68 are then spread apart as shown in Fig. 5 to permit the end of the article 8 to pass therebetween, as shown in Fig. 5. As soon as the article is positioned properly, as shown in Fig. 5, the handles 73 on the burner elements 67 and 68 are moved inwardly to the position shown in Fig. 6, whereby the article is completely surrounded by the burner elements. The switch for the electric motor is then started, whereupon the burners will be rotated. The valve 100 for controlling the flame is then opened to the desired setting whereby gas will flow through the burners, as shown in Fig. 7, and, when the gas is ignited, it will cut off the glass along the line 101, shown in Fig. 8. As soon as the glass has been cut off the device is again raised upwardly out of position and then reversed end for end, whereby the operation is again repeated, both ends of the glass then being cut at the proper place to provide a cylindrical article 8 of the proper length.

In some cases the glass article may be longer and thereby the pivotal movement of the holder would cause the end of the glass article to strike a part of the machine and become damaged or broken. In such cases the glass article is first applied in position, as shown in full lines in Fig. 2, and in dotted lines in Fig. 3. The holder is then raised upwardly from the full line position shown in Fig. 2 to the dotted line position shown in that same figure, whereupon the end of the article will be clear of the machine when the article is swung on its vertical pivot. The article will then be in the position shown in full lines in Fig. 3, whereupon it is lowered until the bottom of the holder collar strikes the stop, whereupon the longer article will be in the position shown in Fig. 5. The stop bar 19 is of such a length as to cause the article to be burned off at the proper point, and, as this point may vary, different stop bars 19 may be provided or an adjustable stop bar may be used.

In each case the article is mounted in position horizontally, because this is the most convenient manner of placing the article on the holder and clamping it in position. After it is clamped the article is swung on its pivot and inserted between the burner elements 67 and 68, which are open during the lowering procedure. The burner elements are then closed, the motor started, and the gas turned on. After the end has been cut off by the burning operation, the gas is shut off, the burner elements are spread apart, the motor is shut off and the device is again raised to clear the burner and then swung 180° where the operation is repeated for cutting off the other end of the article.

The invention provides a machine which is particularly adaptable for elongated tubular members such as glass cylinders. The article remains stationary while the burner rotates. The article is swung about a horizontal pivot along a vertical plane so as to accommodate articles of different lengths and to permit easy insertion and removal of the device from the burners. The burners are spread apart so as to permit the article to be inserted in position and then closed so that the impinging gas flame will be in proper proximity to the outer edge of the glass which is to be cut. The device provides quick burn-off or cut-off and insures a smooth edge without any beads or bumps and does not require any grinding and therefore less handling. The particular type of glass article herein disclosed is cylindrical in shape and is used for blueprint machines and therefore any scratches which may occur on the glass will show up on the finished print. The invention overcomes the likelihood of scratches in that no grinding is necessary, and there is little handling. Therefore, any abrasive which may be on the operator's hands will not come in contact with the glass.

The device may be readily and economically manufactured, and it is efficient in operation and is not likely to get out of order. The device also is capable of accommodating various sizes and lengths of glass tubes or cylinders.

Changes may be made in the form, construction and arrangement of the parts without departing from the spirit of the invention or sacrificing any of its attendant advantages, and the right is hereby reserved to make all such changes as fall fairly within the scope of the following claims.

The invention is hereby claimed as follows:

1. A burn-off glass cutting machine comprising a frame providing a table, having an opening forming a cutting station, and a pedestal extending above the table, a ring-like support member journalled for turning movement on the table, at said station, in alinement with said opening, gear means for turnably driving the ring-like support, an article holding clamp and means for mounting the same for vertical movement, on said pedestal, in alinement with the axis of said opening in the table, and for turning movement about a horizontal axis lying in a vertical plane extending diametrally of said opening, including a weighted counterbalance on said pedestal and remotely controllable means for shifting said counterbalance to adjust said holding clamp vertically on said pedestal, whereby to position an article thereon in cutting position in said opening, a pair of segmental burners pivotally mounted on opposite sides of said ring-like support member and movable thereon to closed position to form annular burner means, at said station, in burn-off cutting position concentric with said opening in the table, said burners being swingably separable to uncover said opening, whereby to allow an article, held in said clamp, to be freely positioned in and withdrawn from cutting position in said opening by operation of said remotely controllable means, said burner sections, when closed, being freely turnable, with said ring-like support, about the axis of said opening, and means for supplying fuel to said burner segments.

2. A burn-off glass cutting machine comprising a frame providing a table, having an opening forming a cutting station, and a pedestal extending above the table, a ring-like support member journalled for turning movement on the table, at said station, in alinement with said opening, gear means for turnably driving the ring-like support, an article holding clamp and means for mounting the same for vertical movement, on said pedestal, in alinement with the axis of said opening in the table, and for turning movement about a horizontal axis lying in a vertical plane extending diametrally of said opening, including a weighted counterbalance on said pedestal and remotely controllable pneumatic pressure means for shifting said counterbalance to adjust said holding clamp vertically on said pedestal, whereby to position an article thereon in cutting position in said opening, a pair of segmental burners pivotally mounted on opposite sides of said ring-like support member and movable thereon to closed position to form annular burner means, at said station, in burn-off cutting position concentric with said opening in the table, said burners being swingably separable to uncover said opening, whereby to allow an article, held in said clamp, to be freely positioned in and withdrawn from cutting position in said opening by operation of said remotely controllable means, said burner sections, when closed, being freely turnable, with said ring-like support, about the axis of said opening, and means, including a rotary coupling, for supplying fuel to said burner segments.

ERNEST L. LILJA.
ANDREW PATERSON.

REFERENCES CITED

The following references are of record in the file of this patent:

UNITED STATES PATENTS

| Number | Name | Date |
|---|---|---|
| 676,699 | Roemisch | June 18, 1901 |
| 684,686 | Grotz | Oct. 15, 1901 |
| 1,577,538 | Parker | Mar. 23, 1926 |
| 1,937,723 | Sloan | Dec. 5, 1933 |
| 2,215,930 | Schreiber | Sept. 24, 1940 |
| 2,361,824 | Dorman | Oct. 31, 1944 |
| 2,384,510 | Volkman | Sept. 11, 1945 |

OTHER REFERENCES

"Modern Laboratory Appliances"; Copyright 1942, p. 226.